Nov. 3, 1942.   R. M. ROBERTS ET AL   2,300,971
CATALYTIC DEHYDROGENATION PROCESS
Filed April 4, 1941
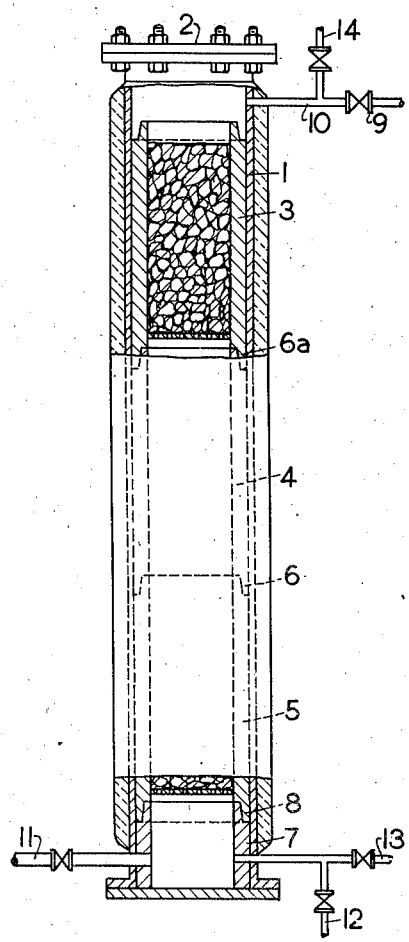
Inventors: Robert M. Roberts
James Burgin.
By their Attorney:

Patented Nov. 3, 1942

2,300,971

UNITED STATES PATENT OFFICE 2,300,971

CATALYTIC DEHYDROGENATION PROCESS

Robert M. Roberts, Berkeley, and James Burgin, Oakland, Calif., assignors to Shell Development Company, San Francisco, Calif., a corporation of Delaware Application April 4, 1941, Serial No. 386,880

10 Claims. (Cl. 260—683)

The present invention relates to a catalytic dehydrogenation process, and more particularly to the catalytic dehydrogenation of hydrocarbon vapors.

The dehydrogenation of hydrocarbons to produce olefines and diolefines from paraffinic hydrocarbons, aromatic hydrocarbons from naphthenic hydrocarbons, cyclopentadiene from cyclopentane, and similar processes are of great importance. In these various processes the most common mode of operation is to pass preheated vapors of the material to be dehydrogenated, sometimes admixed with diluent gases, through a stationary bed of a given supported dehydrogenation catalyst maintained under the desired conditions of temperature, pressure and space velocity. This general method, although in quite wide use, has certain inherent disadvantages which are impossible to completely eliminate and can only be minimized by careful engineering. The most difficult problem encountered in these processes is in supplying the necessary heat to the reaction zone. These various dehydrogenation reactions, as known, are highly endothermic. As a consequence, unless additional heat is supplied to the reaction zone, the vapors to be dehydrogenated are quickly cooled by the reaction before satisfactory conversions are obtained. Sufficient heat usually cannot be introduced with the reactant vapors by further preheating them, since under such circumstances a substantial part of the reactant vapors are contacted with the catalyst at higher than optimum temperatures and degradation, carbon deposition, etc., result. The only practical means so far found to supply the necessary heat is through the reactor walls. Due to the poor heat conductivity of the catalyst, this requires the use of long reaction tubes of small cross section, elaborate heating furnaces, etc. Furthermore, the method at its best is not very efficient inasmuch as cracking, etc., due to higher tube wall temperatures are generally encountered.

An object of the present invention is to provide an improved catalytic dehydrogenation process wherein difficulties usually encountered in supplying the endothermic heat of reaction are entirely obviated. It is furthermore an object of the invention to provide an improved catalytic dehydrogenation process which may be employed in simple, less costly apparatus. A still further object is to provide an improved catalytic dehydrogenation process wherein catalyst cartridges may be more advantageously employed.

These objects are accomplished according to the present invention by effecting the dehydrogenation under changing temperature conditions with specific catalysts promoted to operate most efficiently at different temperatures.

Since catalytic dehydrogenation processes are generally highly endothermic and are furthermore catalyzed by catalysts of the same general type, the process of the present invention may be advantageously applied to the dehydrogenation of a wide variety of materials. Thus, the process is applicable to the dehydrogenation of organic compounds to compounds containing the same number of carbon atoms, but fewer hydrogen atoms. The terms "dehydrogenation" and "dehydrogenating," as used throughout the specification and the appended claims, are used in their true sense, i. e., they do not include those reactions in which oxygen or its equivalent combines with a hydrogen-containing compound to form a compound containing less hydrogen; such reactions are exothermic and entirely different from the usual dehydrogenation reactions in which hydrogen atoms are split from hydrogen-containing compounds with the formation of an unsaturated compound and free hydrogen. Particularly useful applications of the process are, for example, in the technical scale dehydrogenation of saturated heterocyclic nitrogen bases such as piperidine and its homologues, to the conversion of saturated hydrocarbons to the corresponding unsaturated hydrocarbons possessing one or a plurality of double bonds, to the conversion of unsaturated hydrocarbons to still more unsaturated products, and the like. The paraffin hydrocarbons such as ethane, propane, normal butane, isobutane, the pentanes, the heptanes and the like may be dehydrogenated to the corresponding olefines. Olefines may furthermore be dehydrogenated to the corresponding diolefines or other poly-olefines. The cyclo-olefines or naphthenic hydrocarbons may be dehydrogenated to the corresponding unsaturated compounds. For example, cyclohexane may be converted to benzene. The straight or branched chain hydrocarbons may be linked to a cyclic radical as of the aromatic, alicyclic or heterocyclic types. Thus, the dehydrogenation of compounds such as ethyl benzene, propyl benzene, ethyl naphthalene is contemplated. In some cases the higher paraffins may be dehydrogenated and converted to aromatic compounds containing the same number of carbon atoms.

The invention may be applied to the treatment of hydrocarbon mixtures of saturated and/or unsaturated hydrocarbons such as occur in natural gas, cracked gases, cracked petroleum and petroleum products, mixtures resulting from the pyrogenetic treatment of shale oil, peat, asphalt, coal, animal and vegetable oils, etc. Technical olefine-paraffin mixtures such as the propane-propene, butane-butene, pentane-pentene fractions, etc., may be treated as such, and the ratio of olefine to paraffin increased, or the fraction or original mixture from which it is derived may be treated by any suitable means, and the olefines removed therefrom prior to treatment of the paraffins. Motor fuel mixtures such as gasoline may also be treated in accordance with the process of the invention, and the anti-knock qualities of the fuel improved.

In the dehydrogenation of the various materials according to the process of the present invention, no, or substantially no, heat is supplied to the reaction zone through the confining walls of the reactor. Substantially all of the heat required is supplied by the preheated vapors. In this method of operation, as pointed out above, it is impossible or at least impractical to maintain a desired uniform temperature throughout the catalyst bed due to the fact that the reactant vapors are cooled by the endothermic reaction, and if sufficient heat to counterbalance this is put into the preheated vapors, degradation, etc. takes place in the fore-section of the reaction. According to the method of the present invention, however, these facts are appreciated and instead of vainly attempting to overcome them by rapid heating, high space velocities and similar only partially effective means, the reactant vapors are preheated to approximately the desired initial reaction temperature and the process is adjusted to operate most efficiently with a substantial decreasing temperature gradient. While this may not be possible with certain other reactions due to the character of the catalyst employed, it can, we have found, be realized in the case of catalytic dehydrogenation by the use of certain catalyst types.

Numerous catalysts have been proposed for accelerating dehydrogenation. The proposed catalysts, mainly metals and metal oxides, were used per se and supported upon various inert supports and carriers. The great majority of these proposed catalysts and catalyst compositions were, however, inherently unsatisfactory in one or more respects. Many of the known dehydrogenation catalysts were unsuitable because they were too active. Even when mounted on the conventional inactive carriers and supports the catalysts of this class were so active that their use required the employment of prohibitively low temperatures if cracking was to be avoided. Others were unsuitable because of inherent physical characteristics or because of difficulties in preparing them in a sufficiently active and/or stable form. It was found, however, that these various prior-known dehydrogenating materials could be greatly improved and effectively employed as catalysts, by combining them in certain manners with alumina. The use of these improved combination catalysts for dehydrogenation is described and claimed in U. S. Patent No. 2,184,235, December 19, 1939. It was also found that dehydrogenation could be efficiently catalyzed by certain adsorptive aluminas. The use of these catalysts is described and claimed in U. S. Patent No. 2,182,431, December 5, 1939. We have found that the optimum temperature of operation with these two types of dehydrogenation catalysts are for any given dehydrogenation reaction considerably different. In the process of the present invention we make use of this fact to maintain optimum dehydrogenation conditions throughout the reaction zone, even though the temperature therein has an appreciable gradient. An alumina catalyst such as described in U. S. Patent No. 2,182,431, we have found, requires, for the optimum dehydrogenation of isobutane for example, an operating temperature of about 625° C.–650° C. If the temperature is allowed to drop appreciably the conversions are greatly reduced. An alumina catalyst supporting approximately 12% chromium as chromium oxide, on the other hand, gives, we have found, nearly optimum conversions in the same dehydrogenation at reaction temperatures in the order of 550° C.–575° C. The dehydrogenation of butane with a practical conversion of about 30% takes up considerable heat and, if no heat is added or removed during the reaction, this causes a temperature drop of about 90° C. in the reactant vapors. It will be seen that by pure chance the temperature drop caused by the dehydrogenation roughly equals the difference between the optimum temperature required for the two above-described types of catalysts.

In the process of the present invention the reaction zone contains a catalyst bed composed of catalyst of varying composition so arranged that the catalyst in the fore-section (or first-contacted section) of the reaction zone approaches that of the alumina type while that in the after-section (last-contacted section) of the reaction zone approaches that of the most active promoted type. In many dehydrogenation reactions the normal temperature drop is somewhat less than the difference between the optimum temperatures for the reaction with these two catalysts. By employing, instead of the extreme types of these catalysts, i. e., alumina and the most highly active promoted alumina, modifications of these extremes, the differences between the optimum temperatures of the catalyst in the fore- and after-sections of the reaction zone may be made to conform as exactly as desired with the temperature drop in the reaction. For example, instead of employing alumina in the fore-section, one may employ an alumina promoted with a small amount of chromium oxide, for instance 2%–3% Cr as $Cr_2O_3$, in which case the temperature drop in the reaction and the difference between the optimum temperatures for the fore- and after-sections of the catalyst bed are somewhat smaller. Likewise, the same result can be achieved by employing an alumina dehydrogenation catalyst and a promoted catalyst containing only about 8%–10% Cr as $Cr_2O_3$. By adjusting the catalyst composition in this way the optimum temperature requirements for the fore- and after-sections of the catalyst bed may be adjusted to conform to the normal temperature drop in any dehydrogenation reaction and the dehydrogenation may be effected under optimum conditions throughout the length of the catalyst bed without the necessity of adding heat to the reaction zone.

Also, a certain amount of flexibility is possible by the proper choice of the active dehydrogenation promoter applied to the alumina. For example, by selecting a suitable dehydrogenating promoter, higher or lower temperatures may be employed in the last-contacted section of the catalyst bed. For example, if the dehydrogenation reaction is exceptionally endothermic and/or gives very high conversions with a consequently large temperature drop, an alumina promoted by nickel, iron or the like may be employed in the last-contacted section of the catalyst bed. On the other hand, if the temperature drop is quite small, an alumina containing a dehydrogenating metal compound having a higher optimum temperature requirement, such as molybdenum sulfide or the like, may be advantageously employed. In general, however, the dehydrogenating heavy metal oxides are the most suitable promoters since they give optimum results at the temperatures usually encountered in the last-contacted section of the catalyst bed and, furthermore, are usually more amenable to efficient regeneration in situ. Of the various dehydrogenating heavy metal compounds, those of the group VI of the periodic table, and especially chromium, are generally preferred. The dehydrogenating compounds of these metals, and particularly their oxides, are especially active and desirable promoters.

A suitable application of the process for the dehydrogenation of isobutane is, for example, as follows. A well-insulated reaction tube of conventional design is charged with three catalysts having different optimum dehydrogenation temperatures. The fore- or first-contacted section of the tube is packed with an adsorptive alumina supporting 2%-3% chromium as chromium oxide. The optimum dehydrogenation temperature of this catalyst is about 600° C.–625° C. The middle section of the tube is packed with a similar catalyst containing approximately 6% chromium. The optimum dehydrogenating temperature for this catalyst is about 575° C.–600° C. The after- or last-contacted section of the reaction tube is packed with a similar catalyst containing about 12% chromium. The optimum dehydrogenation temperature of this catalyst is about 550° C.–575° C. Isobutane vapors are preheated to a temperature of about 630° C. and passed through the reaction tube.

While, for the sake of simplicity, the foregoing description is confined to the use of catalysts of two and three compositions, the invention is by no means limited thereto. It is often desirable to employ catalysts of four or more compositions in a single bed, those near the middle of the bed being intermediate, as to optimum temperature requirements, between those in the first- and last-contacted sections. In fact, although it is not usually necessary, the catalyst bed, if desired, could be uniformly graded from one end of the bed to the other.

The process of the invention may be performed in apparatus of any conventional type wherein a fixed relatively elongated bed of catalyst is provided. As pointed out above, however, in the present process it is unnecessary to provide means such as a furnace or the like for adding heat to the reaction zone through the reactor walls. Consequently, less costly apparatus of much simpler design may be employed. Not only may the apparatus be much simplified by the elimination of the conventional heating furnace but the converter itself may be greatly simplified. In apparatus for the present process the diameter of the catalyst chamber may be increased from the maximum of about four inches in conventional reactors to several feet. This allows equivalent production capacity to be obtained with much fewer reaction tubes. In order to avoid excessive temperature drops in the reaction zone due to radiation, etc., the reactor is preferably well insulated against heat loss. In some cases where quite high temperatures are employed in the reactor and the tendency to lose heat by radiation, etc., is great, it may be desirable to surround the reaction chamber with a hot fluid medium to avoid such losses.

As stated above, one of the objects of the invention is to provide an improved catalytic dehydrogenation process wherein catalyst cartridges may be advantageously employed. In view of certain difficulties usually encountered in the conventional dehydrogenation processes, such as the difficulty in maintaining a uniform activity in the catalyst bed, difficulty in removing spent catalyst from the converter, difficulty in properly packing the converter with catalyst, etc., the possibility of employing the catalyst in small removable containers or cartridges such as baskets, cylinders with perforated ends, and the like has been given serious consideration. The use of such catalyst cartridges, although quite advantageous theoretically, has been been, however, very successful due to the fact that when such cartridges are employed the catalyst does not directly contact the reactor walls and the already great difficulty in supplying the necessary heat to the reaction zone through the reactor wall is considerably increased. In the process of the present invention, as explained above, it is not necessary to introduce heat to the reaction zone through the reactor walls, and this difficulty is completely obviated.

A suitable application of catalyst cartridges in the process of the invention is illustrated in the attached drawing. Referring to the drawing, the converter comprises a cylindrical, well insulated reactor case 1 provided with a removable top or head 2. Within the converter there is placed a plurality of removable catalyst cartridges 3, 4 and 5. The cartridges, as shown, have non-perforated cylindrical sides, perforated bottoms and open tops. The top and bottom of each cartridge are provided with suitable cooperating members, for example, flush step joints permitting substantially vapor-tight connections 6 and 6a between the adjacent cartridges. The lowermost catalyst cartridge 5 rests upon and cooperates with a foot or supporting member 7 to form a substantially vapor-tight connection 8.

When executing a dehydrogenation process according to the present method, the direction of flow may be either upward or downward. If the direction of flow is downward, cartridge 3 is filled with a dehydrogenation alumina catalyst or such a catalyst containing a small amount of a dehydrogenating promoter. This catalyst cartridge is most efficient only at relatively high operating temperatures. Cartridge 5 is filled with a dehydrogenation catalyst having a relatively low optimum dehydrogenation temperature such, for instance, as an adsorptive alumina promoted with about 12%–30% chromium as chromium oxide. Cartridge 4 is filled with a catalyst intermediate between those is cartridge 3 and cartridge 5, for instance an adsorptive alumina promoted with chromium oxide but containing only about 5%–7% chromium. The catalyst cartridges are then placed in the reactor in the relative positions shown. The material to be dehydrogenated, for instance, butane or propane, is preheated by conventional means not shown to approximately the optimum dehydrogenation temperature of the catalyst in cartridge 3. If this catalyst is unpromoted alumina and the material to be dehydrogenated is propane, this temperature may be in the order of 660° C. The preheated vapors pass to the converter via valve 9 and pipe 10 and contact the catalyst in cartridge 3. During the passage of the reactant vapors through catalyst cartridge 3, a certain amount of cooling takes place due to the endothermic heat of the dehydrogenation. The partially cooled vapors then pass through catalyst cartridge 4 at a substantially optimum temperature. The vapors from cartridge 4 pass through catalyst cartridge 5 at a still lower substantially optimum temperature and are finally withdrawn from the converter via valved outlet 11. Regenerating fluid for the periodic removal of carbonaceous deposits from the catalyst may be periodically introduced into the reactor via valved inlets 12 and 13, and the spent regenerating fluid may be withdrawn via valved outlet 14.

While we have described a single-stage dehydrogenation process, the invention may also be applied in a plurality of conversion stages. Thus, the product from the converter may be treated for the partial or complete removal of the dehydrogenated product and the material again treated in the same or another dehydrogenating unit. As an example of a suitable means of executing our invention in a continuous manner, we may employ a plurality of dehydrogenating units in communication with a storage vessel containing the material to be dehydrogenated and utilize one or more reaction units while one or more are out of use. When the catalyst loses its activity to the extent that the conversion per pass is no longer practical, the material to be treated is diverted to the reactors not previously used or to those containing regenerated catalyst. While dehydrogenation is effected in one or more dehydrogenating units, the used catalyst in others may be regenerated in the conventional manner by oxidizing combustible deposits therefrom.

In the foregoing we have described our invention in a detailed manner, indicating various preferred embodiments as well as certain modifications. Numerous other suitable modifications, many of which may afford slightly more economical operation under certain circumstances, will at once be apparent to those skilled in the art. It is therefore to be understood that the invention is not limited to the exact form or forms described and that all such modifications as fall within the spirit of the invention are intended to be embraced in the language of the accompanying claims.

We claim as our invention:

1. In a process for the catalytic dehydrogenation of isobutane, the improvement which comprises passing vapors of isobutane to be dehydrogenated under dehydrogenation conditions at a continuously decreasing temperature caused by the endothermic heat of the dehydrogenation reaction through an essentially adiabatic converter containing a fixed bed of a plurality of dehydrogenation catalysts of varying composition comprising a dehydrogenating alumina having a relatively high optimum dehydrogenation temperature and a promoter having a relatively low optimum dehydrogenation temperature, said vapors being preheated to about the optimum dehydrogenation temperature of the first-contacted portion of catalyst and said catalysts being so arranged that the proportion of said promoter varies inversely with the temperature along the length of said converter.

2. In a process for the catalytic dehydrogenation of propane, the improvement which comprises passing vapors of propane to be dehydrogenated under dehydrogenation conditions at a continuously decreasing temperature caused by the endothermic heat of the dehydrogenation reaction through an essentially adiabatic converter containing a fixed bed of a plurality of dehydrogenation catalysts of varying composition comprising a dehydrogenating alumina having a relatively high optimum dehydrogenation temperature and a promoter having a relatively low optimum dehydrogenation temperature, said vapors being preheated to about the optimum dehydrogenation temperature of the first-contacted portion of catalyst and said catalysts being so arranged that the proportion of said promoter varies inversely with the temperature along the length of said converter.

3. In a process for the catalytic dehydrogenation of a dehydrogenatable hydrocarbon, the improvement which comprises passing vapors of the hydrocarbon to be dehydrogenated under dehydrogenation conditions at a continuously decreasing temperature caused by the endothermic heat of the dehydrogenation reaction through an essentially adiabatic converter containing a fixed bed of a plurality of dehydrogenation catalysts of varying composition comprising a dehydrogenating alumina having a relatively high optimum dehydrogenation temperature and a promoter having a relatively low optimum dehydrogenation temperature, said vapors being preheated to about the optimum dehydrogenation temperature of the first-contacted portion of catalyst and said catalysts being so arranged that the proportion of said promoter varies inversely with the temperature along the length of said converter.

4. In a process for the catalytic dehydrogenation of a dehydrogenatable hydrocarbon, the improvement which comprises passing vapors of the hydrocarbon to be dehydrogenated under dehydrogenation conditions at a continuously decreasing temperature caused by the endothermic heat of the dehydrogenation reaction through an essentially adiabatic converter containing a fixed bed of a plurality of dehydrogenation catalysts of varying composition comprising a dehydrogenating alumina having a relatively high optimum dehydrogenation temperature and a chromium oxide promoter, said vapors being preheated to about the optimum dehydrogenation temperature of the first-contacted portion of catalyst and said catalysts being so arranged that the proportion of said promoter varies inversely with the temperature along the length of said converter.

5. In a process for the catalytic dehydrogenation of a dehydrogenatable hydrocarbon, the improvement which comprises passing vapors of the hydrocarbon to be dehydrogenated under dehydrogenation conditions at a continuously decreasing temperature caused by the endothermic heat of the dehydrogenation reaction through an essentially adiabatic converter containing a fixed bed of a plurality of dehydrogenation catalysts of varying composition comprising a dehydrogenating alumina having a relatively high optimum dehydrogenation temperature and a promoting dehydrogenating compound of chromium, said vapors being preheated to about the optimum dehydrogenation temperature of the first-contacted portion of catalyst and said catalysts being so arranged that the proportion of said promoter varies inversely with the temperature along the length of said converter.

6. In a process for the catalytic reforming of hydrocarbon distillates, the improvement which comprises passing vapors of a hydrocarbon distillate to be reformed under dehydrogenation conditions at a continuously decreasing temperature caused by the endothermic heat of the dehydrogenation reaction through an essentially adiabatic converter containing a fixed bed of a plurality of dehydrogenation catalysts of varying composition comprising a dehydrogenating alumina having a relatively high optimum dehydrogenation temperature and a promoter having a relatively low optimum dehydrogenation temperature, said vapors being preheated to about the optimum dehydrogenation temperature of the first-contacted portion of catalyst and said catalysts being so arranged that the proportion of said promoter varies inversely with the temperature along the length of said converter.

7. In a process for the catalytic dehydrogenation of a dehydrogenatable hydrocarbon, the improvement which comprises passing vapors of the hydrocarbon to be dehydrogenated under dehydrogenation conditions at a continuously decreasing temperature caused by the endothermic heat of the dehydrogenation reaction through an essentially adiabatic converter containing a fixed bed of a plurality of dehydrogenation catalysts of varying composition comprising a dehydrogenating alumina having a relatively high optimum dehydrogenation temperature and a promoting dehydrogenating compound of a heavy metal of the sixth group of the periodic table having a relatively low optimum dehydrogenation temperature, said vapors being preheated to about the optimum dehydrogenation temperature of the first-contacted portion of catalyst and said catalysts being so arranged that the proportion of said promoter varies inversely with the temperature along the length of said converter.

8. In a process for the catalytic dehydrogenation of a dehydrogenatable hydrocarbon, the improvement which comprises passing vapors of the hydrocarbon to be dehydrogenated under dehydrogenation conditions at a continuously decreasing temperature caused by the endothermic heat of the dehydrogenation reaction through an essentially adiabatic converter containing a plurality of catalyst cartridges communicating in series and containing a plurality of dehydrogenation catalysts of varying composition comprising a dehydrogenating alumina having a relatively high optimum dehydrogenation temperature and a promoter having a relatively low optimum dehydrogenation temperature, said vapors being preheated to about the optimum dehydrogenation temperature of the catalyst in the first catalyst cartridge and said catalyst cartridges being so arranged that the proportion of said promoter in the catalyst therein varies inversely with the temperature along the length of said converter.

9. In a process for the catalytic dehydrogenation of a dehydrogenatable hydrocarbon, the improvement which comprises passing vapors of the hydrocarbon to be dehydrogenated under dehydrogenating conditions at a continuously decreasing temperature caused by the endothermic heat of the dehydrogenation reaction through an essentially adiabatic converter containing a fixed bed of a plurality of dehydrogenation catalysts of varying composition comprising a dehydrogenating alumina having a relatively high optimum dehydrogenation temperature and a promoting dehydrogenating compound of a heavy metal having a relatively low optimum dehydrogenation temperature, said vapors being preheated to about the optimum dehydrogenation temperature of the first-contacted portion of catalyst and said catalysts being so arranged that the proportion of said promoter varies inversely with the temperature along the length of said converter.

10. In a catalytic dehydrogenation process, the improvement which comprises passing vapors of a dehydrogenatable organic compound to be dehydrogenated under dehydrogenation conditions at continuously decreasing temperature caused by the endothermic heat of the dehydrogenation reaction through an essentially adiabatic converter containing a fixed bed of a plurality of dehydrogenation catalysts of varying composition comprising a dehydrogenating alumina having a relatively high optimum dehydrogenation temperature and a promoting dehydrogenating compound of chromium, said vapors being preheated to about the optimum dehydrogenation temperature of the first-contacted portion of catalyst and said catalysts being so arranged that the proportion of said promoter varies inversely with the temperature along the length of said converter.

ROBERT M. ROBERTS.
JAMES BURGIN.